H. G. KOENIG.
STOCK AND POULTRY CATCHER.
APPLICATION FILED JAN. 30, 1915.
1,182,018. Patented May 9, 1916.
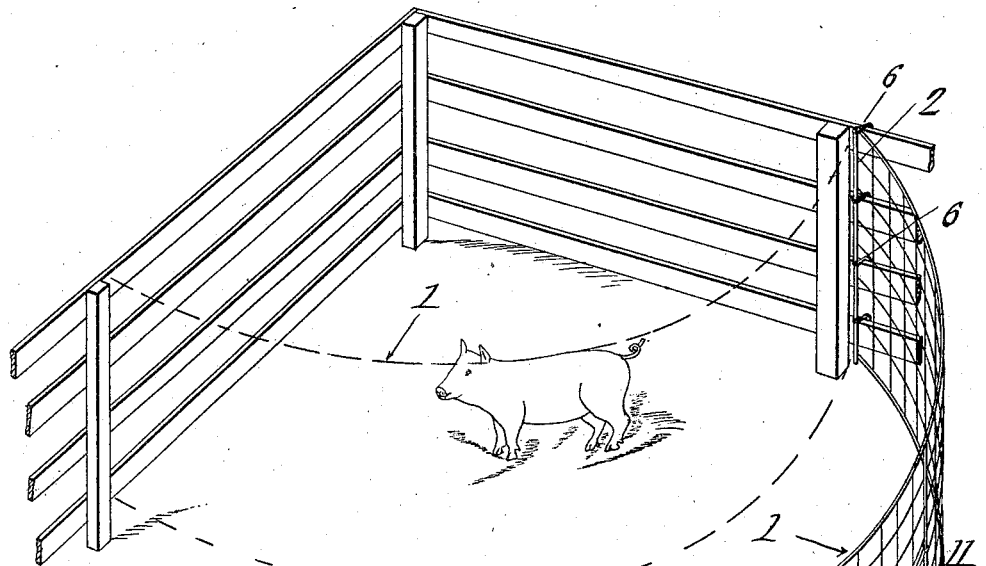
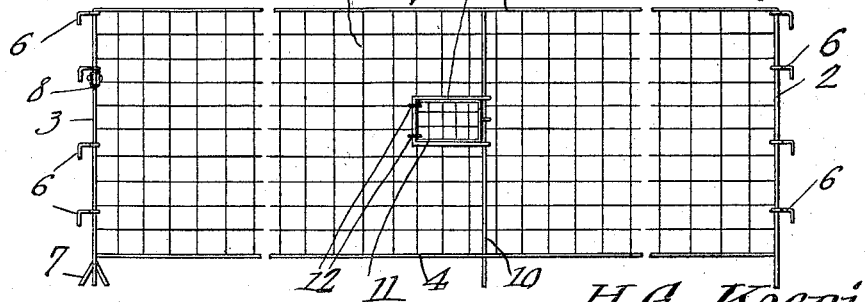
Witnesses
H. G. Koenig
Inventor
by
Attorneys

UNITED STATES PATENT OFFICE.

HENRY G. KOENIG, OF CLINTON, MISSOURI.

STOCK AND POULTRY CATCHER.

1,182,018. Specification of Letters Patent. Patented May 9, 1916.

Application filed January 30, 1915. Serial No. 5,255.

*To all whom it may concern:*

Be it known that I, HENRY G. KOENIG, a citizen of the United States, residing at Clinton, in the county of Henry and State of Missouri, have invented a new and useful Stock and Poultry Catcher, of which the following is a specification.

The present invention appertains to stock and poultry catchers, and aims to provide a novel and improved device of that character which will enable stock and poultry to be caught and confined within a relatively small captivity space.

This invention has for its object, the provision of a stock and poultry catcher applicable to a fence, barn and other similar support, and adapted to be manipulated for catching and confining poultry.

Another object of the invention is the provision of a stock and poultry catcher of the nature indicated, having means whereby chickens and other small farm stock may be readily removed from the confining or captivity space when the stock or poultry is caught.

It is also within the scope of the invention to provide a catching device of the character specified, which is improved generally in its construction and details, to enhance the utility thereof, the catcher being comparatively simple and inexpensive in construction, and being convenient, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in its preferred embodiment in the accompanying drawing, wherein:—

Figure 1 is a perspective view of the catcher as in use. Fig. 2 is a side elevation of the device, parts being broken away.

The present stock and poultry catcher embodies an elongated net 1 constructed of wire stock, having sufficient inherent rigidity to hold the net in shape, and prevent the same from collapsing while in use. The net 1 is also sufficiently flexible or bendable so that it may be flexed during the use thereof, or may be rolled up when not in use, for the purpose of compact storage or shipment.

The net 1 comprises stiff upright end rods or members 2 and 3, and upper and lower longitudinal or horizontal wires 4 connecting the ends 2 and 3, the wires being relatively stiff and rigid, to uphold the netting when it is extended, but are sufficiently flexible for enabling them to bend when the netting is bent or flexed during the catching operation. A flexible wire filler 5 is secured to and within the flexible frame formed by the rods 3 and 4, and preferably is of coarse wire mesh.

Each of the upright end rods 3 is provided with a vertical series of hooks 6 which are engageable to a wooden or wire fence, or to a barn or other support. The lower end of the rod 3 is provided with a tripod 7 for supporting it upon the ground, and a brace 8 is pivoted to the rod 3 adjacent its upper end, and is adapted to have its lower end inserted into the ground for supporting the rod 3 and preventing the central or intermediate portion of the netting from sagging, especially when the catcher is in the position illustrated in Fig. 1.

The net 1, or filler 5 thereof, is provided with a doorway or opening 9 between its ends, and an upright rigid rod 10 is secured to the net 1 at one side of the door opening 9, and has a door or gate 11 hinged thereto to normally close the opening 9, suitable catches 12 being employed for holding the free end of the door or gate 11 adjacent the filler 5, when it is desired to hold the door closed. The lower end of the vertical rod 10 projects below the net to engage the ground, for assisting in supporting the intermediate portion of the net, and whereby the door or gate 11 is firmly held in position.

In use, the catcher may be employed for catching various animals, chickens, and other farm stock. Thus, supposing it is desired to catch an animal within an inclosure defined by a fence, the end rod 2 of the net 1 may be engaged to the fence, preferably adjacent one corner thereof, by engaging the hooks 6 thereof over the rails, wires or other portions of the fence, as illustrated in Fig. 1, and the rod 3 may then be disposed upon the ground at a point slightly distant from the fence, to hold the net 1 in position to receive the animal between the net and fence, as suggested in Fig. 1. Then, the operator may grasp and lift the rod 3, and may carry the free end of the net 1 toward the fence, so as to trap the animal between the net and fence, and the free end of the net may then be brought adjacent the fence and attached thereto by engaging the hooks 6 of the rod 3 to the fence. This will provide a relatively small captivity space or inclosure for confining the animal therein, in order that the animal may not escape. If desired, the operator can step inside of the space between the net and fence, before the rod 3 is attached to the fence, in order that the operator may enter the captivity space for catching the animal by hand therein, it being noted that the captivity space is of small encompass in order that the animal may be caught readily.

The device may also be employed for catching chickens, and when they are caught by the net, the door 11 may be opened, so that the operator can insert his arm through the door opening 9 for catching and withdrawing the chickens from the confining space. The door 11 being carried by the rod 10 will be properly supported by the net, and the rod 10 will also reinforce the central or intermediate portion of the net.

The present device may also be attached to a barn or other support, for trapping the animal adjacent the same in a manner which will be apparent from the foregoing.

The other advantages and capabilities of the present structure are thought to be obvious from the foregoing taken in connection with the drawing and will suggest themselves to those versed in the art.

Having thus described the invention, what is claimed as new is:—

A stock and poultry catcher, comprising a flexible net having stiff upright rods at its ends provided with hooks for engaging a fence or other support, the lower end of one rod having a tripod to rest on the ground, a brace pivoted to said rod to assist in supporting the same upon the ground, the net having a door opening between its ends, an upright rod carried by the net at one side of said opening and having its lower end projecting below the net to engage the ground, and a door carried by the last mentioned rod for closing said opening, there being means for holding said door closed.

In testimony that I claim the foregoing as my own, I have hereto affixed my signature in the presence of two witnesses.

HENRY G. KOENIG.

Witnesses:
 GUY O. TOBIAS,
 GEORGE G. GRAHAM.

Copies of this patent may be obtained for five cents each, by addressing the "Commissioner of Patents, Washington, D. C."